(12) United States Patent
Strauss

(10) Patent No.: US 7,767,014 B2
(45) Date of Patent: Aug. 3, 2010

(54) CASTABLE MASS REDUCED MACHINABLE MOLD MATERIAL

(75) Inventor: Eric B. Strauss, Longmont, CO (US)

(73) Assignee: EBS Concepts, LLC, Boulder, CO (US)

( * ) Notice: Subject to any disclaimer, the term of this patent is extended or adjusted under 35 U.S.C. 154(b) by 0 days.

(21) Appl. No.: 11/974,776

(22) Filed: Oct. 16, 2007

(65) Prior Publication Data

US 2008/0092775 A1    Apr. 24, 2008

Related U.S. Application Data

(60) Provisional application No. 60/852,031, filed on Oct. 16, 2006.

(51) Int. Cl.
- *B22C 9/00* (2006.01)
- *B28B 21/76* (2006.01)
- *B29C 33/00* (2006.01)
- *C04B 28/14* (2006.01)

(52) U.S. Cl. .......... 106/38.35; 106/38.2; 106/38.3; 106/778; 106/781; 264/333

(58) Field of Classification Search .......... 106/38.2, 106/38.3, 38.35, 778, 781; 264/333
See application file for complete search history.

(56) References Cited

U.S. PATENT DOCUMENTS

| | | | | |
|---|---|---|---|---|
| 2,571,343 A | * | 10/1951 | Dailey et al. | 524/436 |
| 2,694,025 A | * | 11/1954 | Games et al. | 428/102 |
| 2,770,840 A | * | 11/1956 | Biefeld et al. | 264/232 |
| 2,842,121 A | * | 7/1958 | Billings et al. | 602/8 |
| 5,288,775 A | * | 2/1994 | Bischoff et al. | 524/2 |
| 6,352,609 B1 | | 3/2002 | Southmayd et al. | |
| 2002/0151233 A1 | | 10/2002 | Renard et al. | |
| 2006/0000612 A1 | | 1/2006 | Reddy et al. | |
| 2008/0057318 A1 | * | 3/2008 | Adzima et al. | 428/426 |

OTHER PUBLICATIONS

AXSON Material Safety Data Sheet, AXSON North America, Inc., doc. No. AXF15.004 Rev. A, Feb. 21, 2003, pp. 1/4-4/4.
Saint-Gobain Vetrotex Material Safety Data Sheet, Saint-Gobain Vetrotex International S.A., Revision 1, Nov. 2001, pp. 2.13-13.13.
Dallas Material Safety Data Sheet, fax date of Sep. 10, 2001, five total pages.
Material Safety Data Sheet, BTL Specialty Resins Corp., MSDS No. BTL/BTLM415, Mar. 15, 199, two total pages.
E.P.S., Inc. Material Safety Data Sheet, 85-2222812, Sep. 14, 2001, pp. 1-3.
Material Safety Data Sheet, Inforsafe No., LPWZW, Nov. 22, 2007, pp. 1-5.
E.P.S., Inc. Material Safety Data Sheet, 85-1112812, Jul. 11, 1994, pp. 1-3.

* cited by examiner

*Primary Examiner*—Anthony J Green
(74) *Attorney, Agent, or Firm*—Craig R. Miles; CR Miles, P.C.

(57) ABSTRACT

A mold material castable to provide a mass reduced work piece machinable to produced a mold and methods of utilizing such mold material to cast mass reduced work pieces machinable to produce a mold.

16 Claims, 6 Drawing Sheets

CASTABLE MASS REDUCED MACHINABLE MOLD MATERIAL

This United States Non-provisional Patent Application claims the benefit of U.S. Provisional Patent Application No. 60/852,031, filed Oct. 16, 2006, hereby incorporated by reference herein.

I. BACKGROUND

A mold material castable to provide a mass reduced work piece machinable to produce a mold.

Conventional mold production can involve the purchase of foam modeling material which can be machined and utilized as a mold for the production of molded or formed parts at high temperature (hereinafter referred to as "high temperature foam material"), such as the foam modeling material Renshape 460 available from Huntsman International LLC, Belgium. A plurality of pieces of the high temperature foam material can be joined to produce pieces of high temperature foam material of sufficient size to machineably produce a high temperature foam mold. A surface coat may be applied to the machined high temperature foam mold to generate a surface on which parts can be molded at temperatures typically at or above 175° Fahrenheit (° F.).

However, there remain long felt but unresolved problems with conventional high temperature foam molds. A first substantial problem with convention high temperature foam molds can be that the high temperature foam material comes in relatively small pieces and a plurality of the pieces must be joined to generate high temperature foam material pieces of sufficient size from which a high temperature foam material mold can be produced. However, when a plurality of high temperature foam material pieces are joined the joints of the joined piece of high temperature foam material can manifest incongruities in the surface of the high temperature foam mold which can transfer to the molded parts. Additionally, the joints in a high temperature foam mold exhibit different material characteristics than the body of the high temperature foam material. This difference in material characteristics between the joints and the body portions of the high temperature foam mold can cause the pieces of a high temperature foam mold to travel, exhibit flexure, or bend about the location of the joint(s), each such occurrence altering the configuration of the high temperature foam mold.

Another substantial problem with conventional high temperature foam molds can be that the high temperature foam material alters configuration under increased atmospheric pressures or increased atmospheric pressures and increased temperatures. Molded parts are often molded, formed or cured at temperatures and pressures greater than ambient temperatures and pressures. When utilizing high temperature foam molds the temperatures and pressures must be adjusted within ranges of temperatures or pressures which may not be optimal but serve to avoid altering the configuration of the high temperature foam mold during the molding or curing of molded parts. None-the-less, at increased temperature and pressure a high temperature foam mold may rapidly degrade and only have a life span sufficient to generate a few molded parts (in some circumstances only one or two molded parts).

A related substantial problem with high temperature foam molds can be that the high temperature foam material cannot be utilized or has low utility at atmospheric pressures used to generate vacuum molded parts. At pressures below ambient pressure (or at atmospheric pressures at which molded parts are vacuum formed) the high temperature foam material can expand sufficiently to alter the configuration of the high temperature foam mold, cause damage to the high temperature mold, or otherwise alter the high temperature foam material, such that it can no longer be utilized for the molding or forming of molded or formed parts.

Another related problem with high temperature foam molds can be that the coefficient of thermal expansion of the high temperature foam material is too great in the context of the temperatures which must be utilized to produce a particular molded part. That is, expansion of the high temperature foam mold is too great over the range of temperatures at which the molded parts are formed.

Another substantial problem with high temperature foam molds can be that the high temperature foam material is prohibitively expensive to use for production of a high temperature foam mold. This may in the first instance due to the cost of the high temperature foam material or in the second instance the amount of labor required to join the plurality of pieces of high temperature foam material, or may be due to both the material and labor expense.

Another substantial problem with high temperature foam molds can be that the grain of the high temperature foam material can transfer to or print through to the molded or formed parts. This is particular true when the material from which molded parts are produced has a hardness which is greater than the hardness of the high temperature foam material.

Another substantial problem with high temperature foam molds can be that they cannot be used in press molding. Currently, to perform press molding metal or concrete molds are utilized to withstand the temperatures or pressures or both exerted on the mold.

As an alternative to using high temperature foam molds, other types of conventional mold materials can be utilized such as concrete, thermal plastic resins, or other materials which are compatible with molding parts on the external surfaces at temperatures and pressures as above-described. A significant problem with molds made from these conventional materials can be that finished molds are solid and have great mass. The mass of these conventional molds may not be reduced because the conventional mold material when prepared and prior to being cured may not be compatible with other materials, or may not be applied to the surface of other materials in manner that allows the conventional mold material to bond or remain fixed to the surface of other materials. As such, a sufficiently thick layer of these conventional mold materials may not be generated over the surface of lighter materials.

Another significant problem in using conventional mold materials including those mold materials prepared from mixing and curing conventional ratios of gypsum, melamine formaldehyde resin, and acrylic copolymer cross linked with an ammonium chloride can be that the molds warp at the temperatures at which molded parts are molded due to non-uniform thermal expansion of the conventional mold materials. Warping of conventional mold materials at temperatures at which molded parts are produced transmits the warp to the molded parts.

The inventive mold materials, mold compositions, composition formulations and methods of utilizing such mold materials, mold compositions, or composition formulations to produce molds and molded parts described herein addresses each of the long felt but unresolved problems with the production and use of conventional high temperature foam molds.

II. SUMMARY OF THE INVENTION

Accordingly, a broad object of the invention can be to provide mold compositions or mold materials which can be cast to produce molds with which molded parts can be produced.

Another significant object of the invention can be to provide inventive mold compositions which avoid utilization of any high temperature foam material in the production of a mold. This obviates the expense of purchasing the high temperature foam material and the expense of efforts to join a plurality of pieces of the high temperature foam material together to form a single piece of sufficient size from which to produce the mold.

Another significant object of the invention can be to provide inventive mold compositions which avoid the joints established by joining a plurality of pieces of high temperature foam material together. Elimination of such joints or even the reduction in the number of joints serves to eliminate or reduces the number or severity of the incongruities manifest in the mold (whether surface incongruities or configuration incongruities) which can transfer to molded parts. Additionally, elimination of such joints resolves the problem of travel of the mold about these joints such as flexure or bending.

Another significant object of the invention can be to provide inventive mold compositions from which molds can be produced for use at temperatures and pressures which are above or below ambient temperature or pressure without substantial expansion, contraction or other alteration in the mold configuration. These characteristics of the inventive mold composition allow molding or forming of parts in ranges of temperature or pressure or both not possible with conventional high temperature foam molds including molded parts which are vacuum formed or are cured at high temperatures and pressures, such as those temperature and pressures achievable in an autoclav or similar adjustable temperature or pressure containment device, or at temperatures up to about 600° F., or at pressures of between about 200 pounds per square inch to about 500 pounds per square inch.

Another significant object of the inventive mold compositions can be to produce molds on which a large number of molded parts can be made without substantial degradation of the mold even at temperatures or pressures which are above or below ambient temperature and pressure, or at which conventional high temperature foam molds cannot be utilized.

Another significant object of the inventive mold compositions can be to produce molds which do not have a grain which transfers or prints through to molded parts or has a reduced amount of grain which reduces transfer or print through of such reduced amount of surface grain.

Another significant object of the inventive mold compositions can be to produce molds which can be utilized to press mold parts.

Another significant object of the inventive mold compositions can be to provide a mold composition which can be applied over the surface of a lesser weight material such as a foam material to generate a thickness of mold material over the lesser weight material having sufficient thickness to configure the external surface of the layer of mold material for use as a mold.

Naturally, further objects of the invention are disclosed throughout other areas of the specification, drawings, photographs, and claims.

III. A BRIEF DESCRIPTION OF THE DRAWINGS

IV. DETAILED DESCRIPTION OF THE PREFERRED EMBODIMENTS

A mold material castable to provide a mass reduced work piece machinable to produced a mold and methods of utilizing such mold material to cast mass reduced work pieces machinable to produce a molds.

Figure 1:
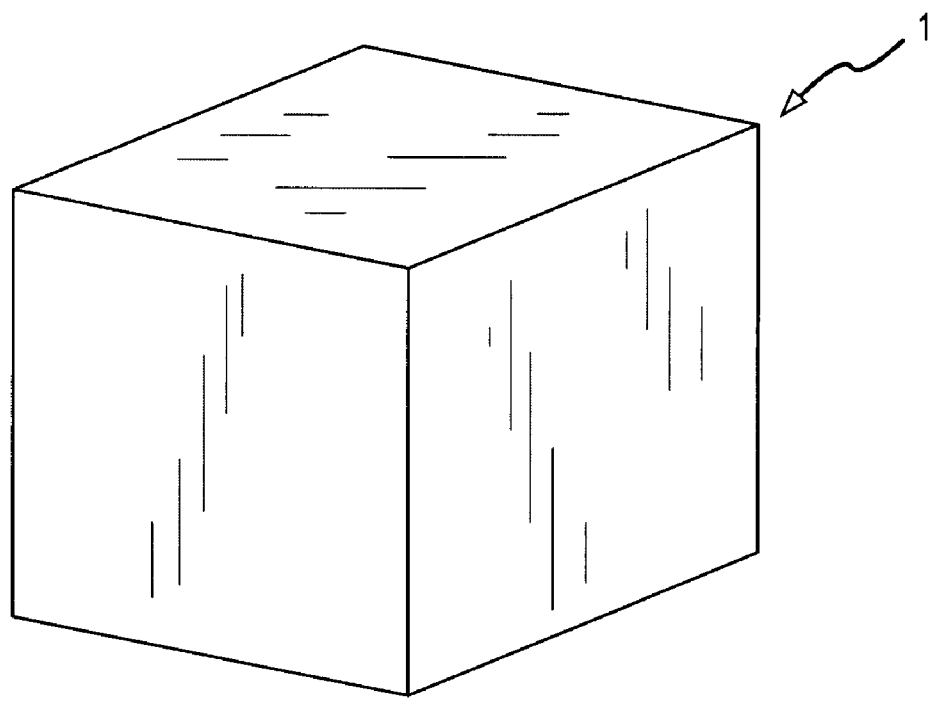
FIG. 1 is a perspective drawing of an amount of foam material.

Now referring primarily to FIGS. 1-5, which show a particular method of utilizing the inventive mold material or mold compositions to produce a mold. As shown in FIG. 1, an amount of foam material (1) utilized in accordance with the invention can be obtained in numerous and varied configurations and while the amount of foam material (1) shown in FIG. 1 has rectangular sides this is not intended to be limiting with respect to other configurations in which the amount of foam material (1) can be obtained or configured, such as cubes, pyramids, spheres, or the like. Because the amount of foam material (1) utilized in accordance with the inventive method can be any manner of machinable foam material, the amount of foam material (1) can be selected from a group of numerous and varied foam materials including, but not limited to, closed cell foams such as STYROFOAM, urethane foam, epoxy foam, polystyrene foam, or the like, and can even include conventional high temperature foam materials, however the use of these conventional foam materials can be obviated by utilizing the inventive mold production method set out herein.

Figure 2:
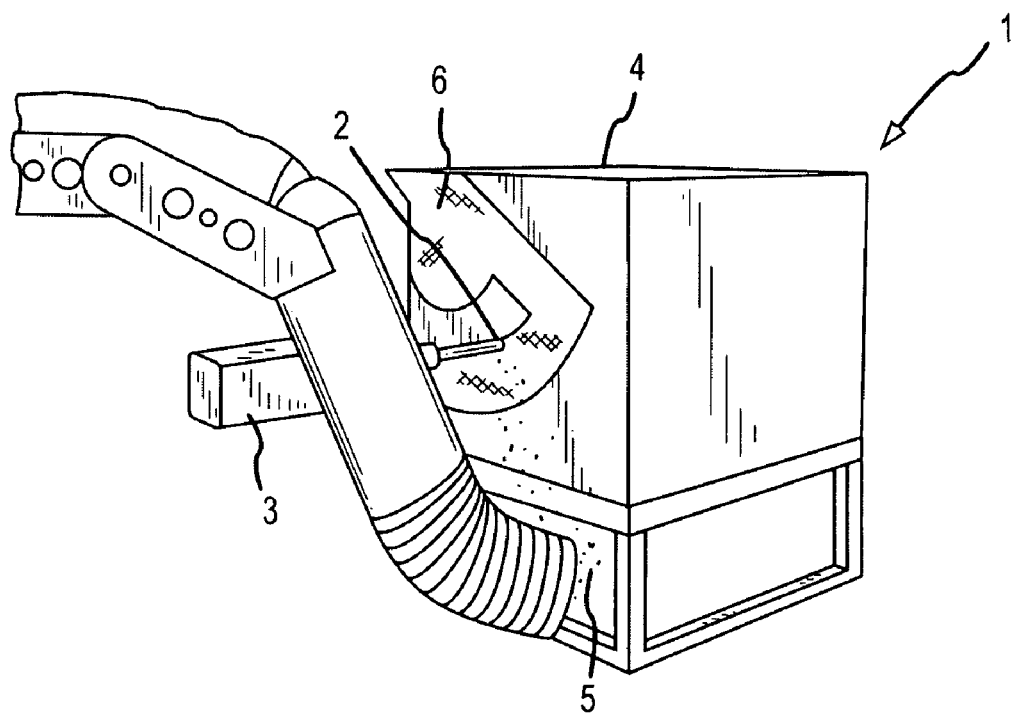
FIG. 2 is a perspective drawing of the foam material machined into a particular configuration of mold form.
Figure 3:
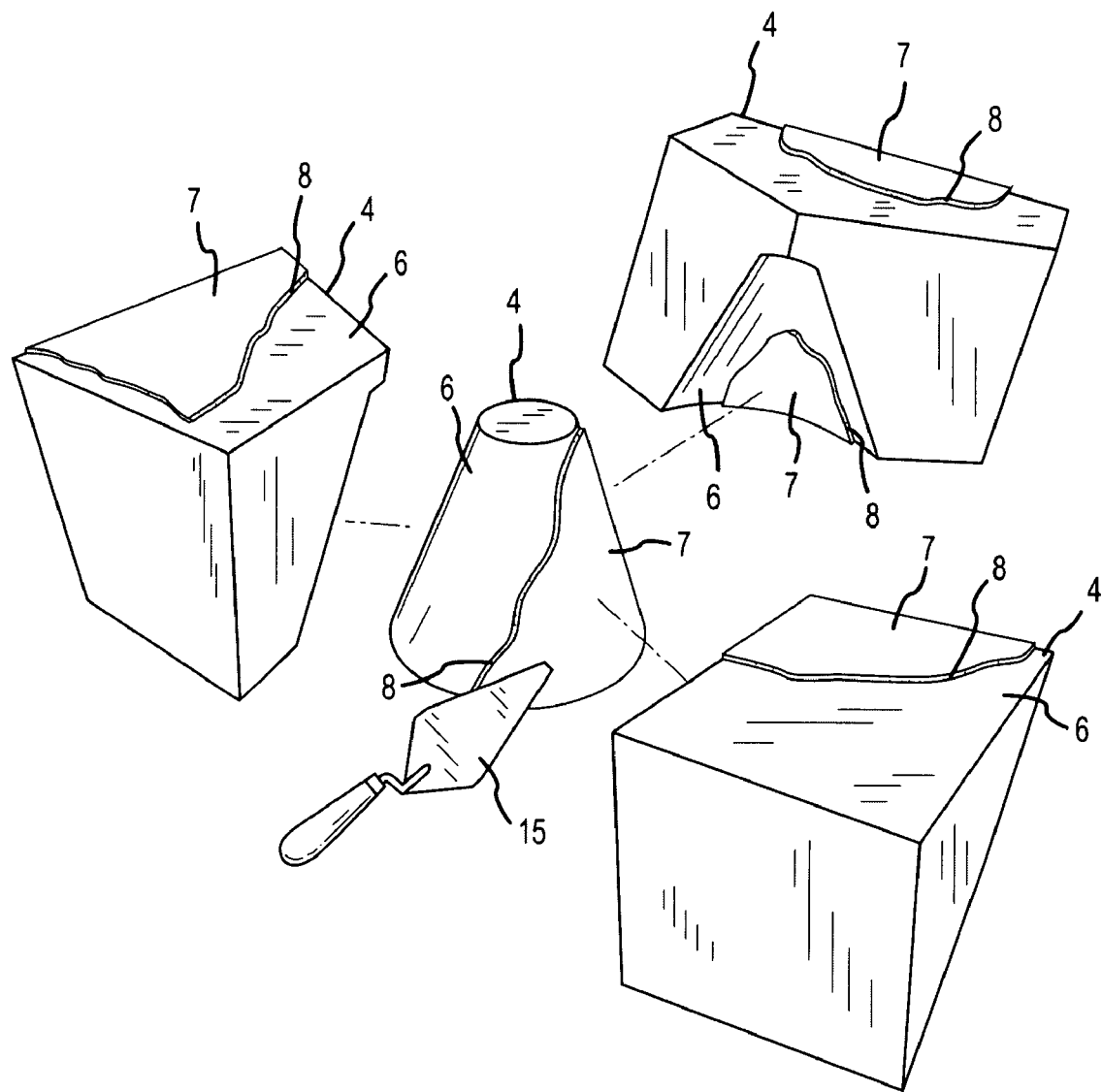
FIG. 3 is an exploded view of the plurality of mold forms of a particular configuration to which an amount of the mold material can be applied to generate a layer of mold material.

Now referring primarily to FIGS. 2 and 3, a cutting tool (2) operably coupled to a machine (3) can engage the foam material (1) to generate a removed amount of foam material (5) to produce a mold form (4) having mold form surface (6) which receives an amount of mold material (or mold composition) (7). While FIG. 2, shows a particular cutting tool (2) and a particular machine (3) which drives the cutting tool (2), the invention is not so limited and any manner tool or device which removes an amount of the foam material (1) to generate in part or in whole the mold form (4), including hand tools, hand held power tools, tools or systems which can be computer programmed, or the like can be utilized. As shown in FIG. 3, a single mold form (4) or a plurality of mold forms (4) can be generated with each mold form (4) providing a discrete mold form surface (6). While the mold forms (4) shown by FIG. 3 have mold form surfaces (6) configured to provide opposed conical configured surfaces, any manner of configured mold form surface (6) can be produced from the amount of foam material (1).

Again referring to FIG. 3, an amount of mold material (7) (or mold composition or mold formulation) can be applied to the mold form surface (6) as a layer (8) of mold material (7) typically having a thickness of about one-quarter inch to about one inch; however, the invention is not limited to any particular layer (8) thickness and the layer (8) of mold material (7) can be any thickness necessary or desirable. As to certain embodiments of the invention, the mold composition (7) can be cast as a solid block without reducing the mass of the mold material (7) by utilizing the mold form (4) or used to make splash molds. Typically, however, the mold form (4) configured from the amount of foam material (1) is utilized to provide a mass reduced mold (9) (shown for example in FIG. 5) comprising only the layer (8) of mold material (7). The application of the mold material (7) to the mold form (4) can be made in any manner which transfers and distributes the amount of the mold material (7) as a layer (8) on the mold form surface (6), including any manner of mold material transfer tool (15) such as a part of the hand, a trowel, a spatula, or the like. The various mold compositions herein described bond to the surface of the mold form (4). The term "bond" means that the mold compositions are formulated to provide sufficient affinity to the external surface of the mold form to allow a layer of mold composition to be established on the entirety or a part of the external surface of the mold form of sufficient thickness to allow the external surface of the cured mold material to be configured to provide a mold for the production of molded parts.

Figure 4:
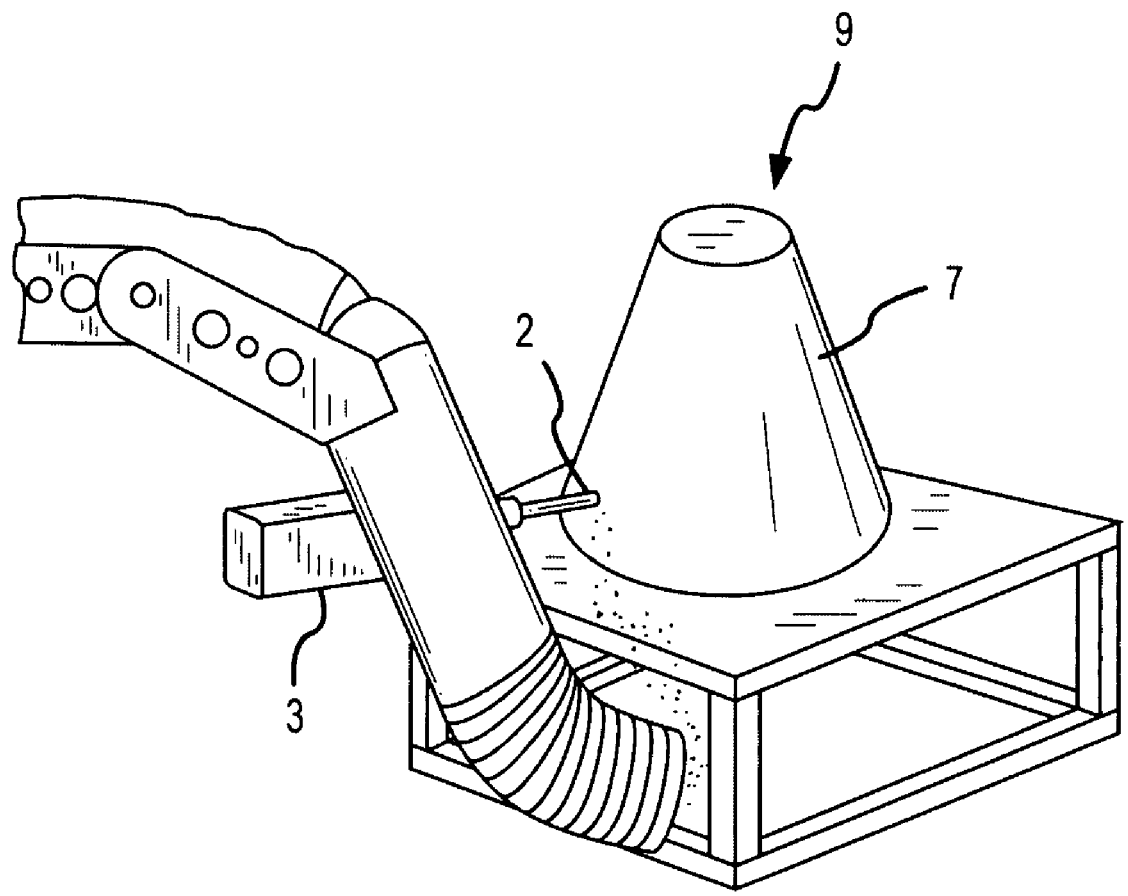
FIG. 4 is a perspective view of a layer of the inventive mold material machined to produce a mold of a particular configuration.
Figure 5:
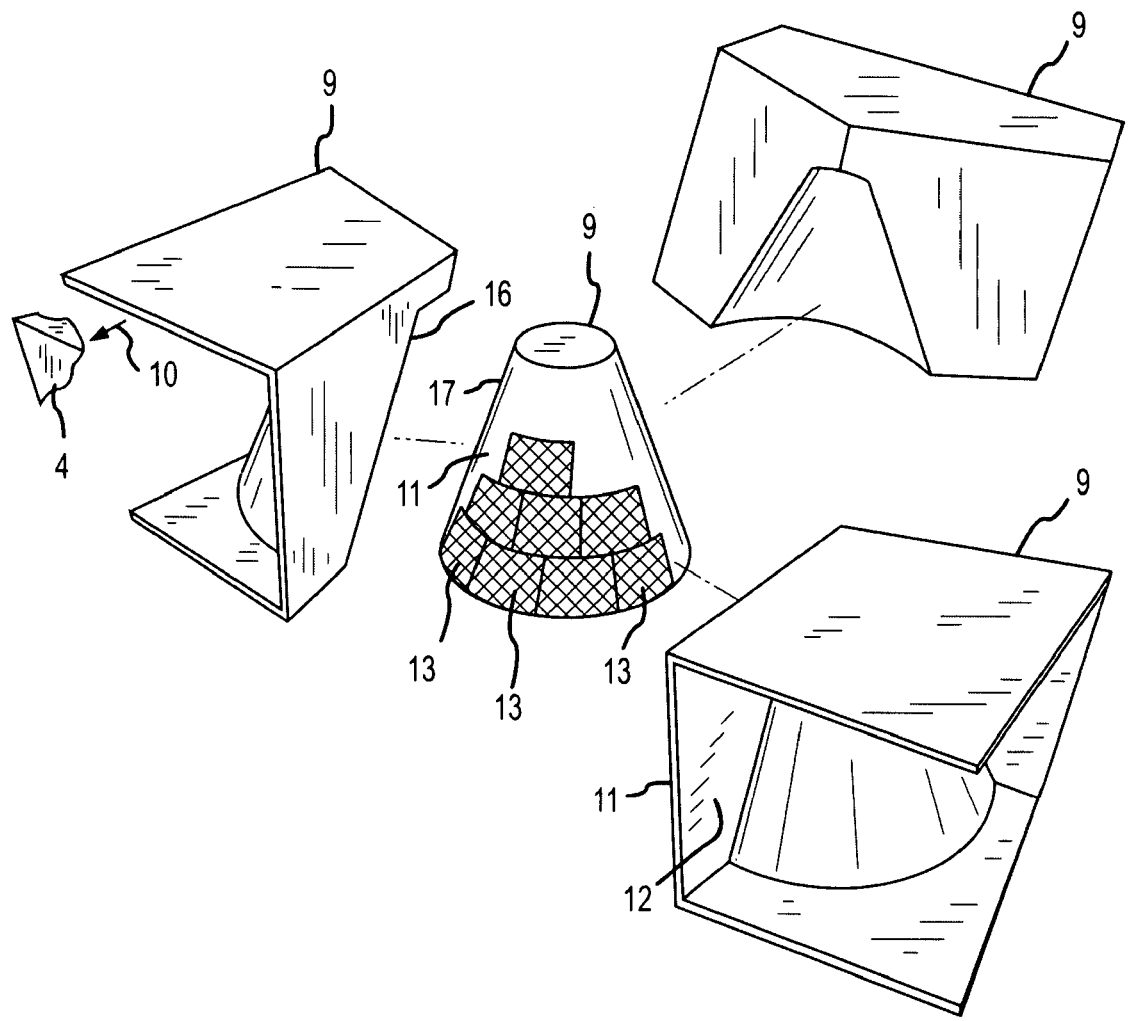
FIG. 5 is an exploded view of a plurality of molds produced utilizing the mold material and the method of producing a mold to which an amount of moldable material can be applied.

Now referring primarily to FIGS. 4 and 5, the cutting tool (2) operably coupled to the machine (3) can engage the layer (8) of mold material (7) to remove a part of the thickness of the layer (8) of mold material (7) to achieve the final configuration of the mold (9) (as shown in FIG. 5). Additional tools or abrasives can be engaged with the layer (8) of mold material (7) to achieve the final mold (9) configuration and without limitation include hand tools, powered hand tools, computerized tool systems, files, abrasive sheet, or the like. As to certain embodiments of the invention, the mold form (4) can be disengaged (10) from the layer (8) of mold material (7) (as shown in FIG. 5) resulting in a mold (9) comprising the layer (8) of mold material (7) having a first mold surface (11) configured to the desired specification and a second opposed surface (12) having substantially the configuration imparted by the form mold (4). Because the amount of mold material (7) bonds to the form mold (4) as above described, disengagement of the form mold from the layer (8) of mold material (7) may require tearing or breaking or otherwise removing the form mold (4) from the cured layer (8) of mold material (7).

Now referring specifically to FIG. 5, an amount of formable material (13) can be applied to a part or the entirety of the first mold surface (11) (or the plurality of first mold surfaces in whole or in part). The formable material (13) can be selected from a numerous and varied group of formable materials (13) which can be applied to the first mold surface (11), whether individually or in various permutation and combinations, including, but not limited to, pre-impregnated woven materials such as woven carbon fiber, woven fiber glass, woven KEVLAR, or the like pre-impregnated with one or more of epoxy resin, phenolic resin, cyanide ester resins, BMI, or the like. While the formable material (13) shown in FIG. 5 has been applied to the first mold surface (11) as a plurality of sheets of formable material (13) the invention is not so limited and the formable material (13) can be as to certain applications applied as one piece of formable material. The formable material (13) can also as to certain applications be applied in a plurality of layers of formable material (13) whether as a plurality of overlapped pieces or as a plurality of pieces layered on top of each other. Additionally, while the mold (9) shown by FIG. 5 comprises a double sided mold which provides opposed mold surfaces (16)(17) each of which engage one of the opposed sides (18)(19) of the molded part (14) (see FIG. 7), the mold (9) can also comprise a single sided mold which only engages only one of the opposed sides (18)(19) of the molded part (14).

Figure 6:
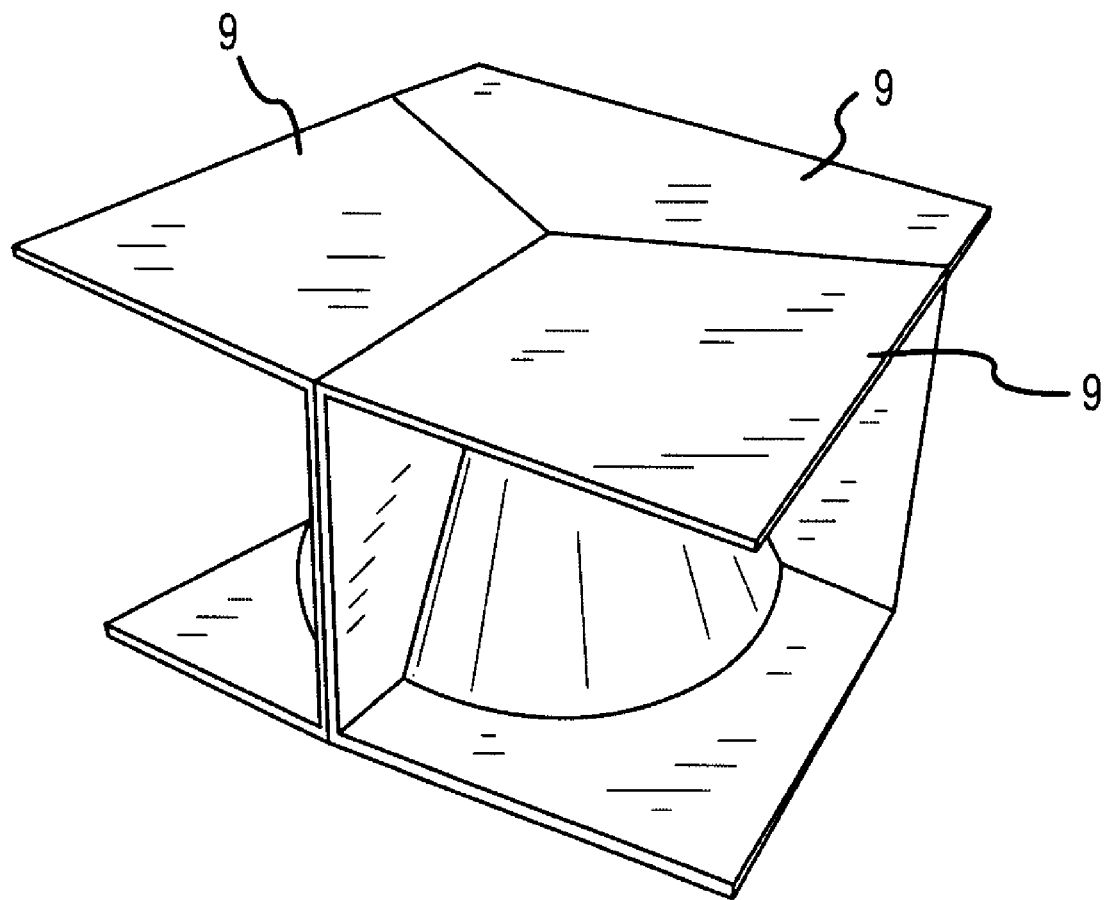
FIG. 6 is a perspective view of the particular configuration of mold shown in FIG. 5 assembled to produce a molded part.

Now referring primarily to FIG. 6, the portions of the mold (9) can be mated so that the formable or moldable material (13) can be formed or molded to the configuration of the first mold surfaces (11), whether in whole or in part. As to one particular manner of forming or molding the molded part (14), the assembled molds (9) are enclosed within an evacuatable container (such as a plastic container or a plastic container having flexible walls) the atmospheric pressure within the evacuatable container can be reduced and the temperature of the molds can be increased sufficiently to generate travel in the formable material (13) such that the formable material (13) forcibly engages a portion of the first mold surfaces (11) of the mold (9). This particular description of molding a part (14) is not intended to be limiting with respect to the numerous and varied methods of molding a part (14) with molds (9) produced utilizing the inventive mold materials (7) (or otherwise referred to herein as mold compositions, or mold formulations) whether the molds (9) produced from the inventive mold material (7) are produced by the inventive method of producing molds described herein or otherwise.

Figure 7:
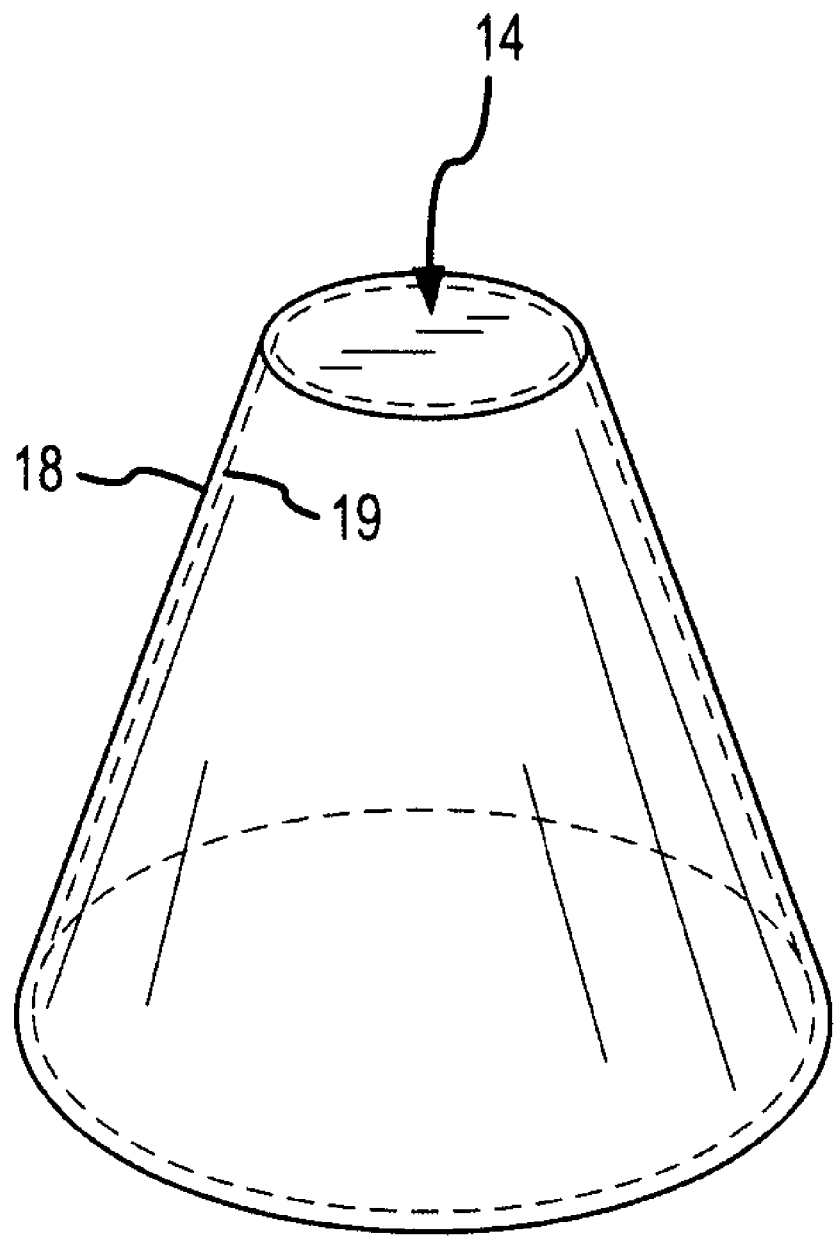
FIG. 7 is a perspective view of a particular part molded in accordance with the inventive molding method.

Now referring primarily to FIG. 7, after the forming or molding process has occurred and the molded or formed part (14) has cured, the mated portions of the mold can be disengaged to release the molded or formed part (14).

Exemplary non-limiting embodiments of the inventive mold composition (7) (also referred to as "mold compositions" or "mold formulations") which can be utilized in the above described method of producing a mold, or utilized in other mold production applications including as a replacement for conventional mold materials, or the like, can include each of the following:

TABLE 1

| RAW MATERIALS | PERCENT BY WEIGHT |
| --- | --- |
| Alpha Gypsum | about 50% to about 75% |
| Melamine Formaldehyde Resin | about 5% to about 7% |
| Ammonium Chloride | about 0.1% to about 1% |
| Acrylic Copolymer | about 20% to about 45% |

TABLE 2

| RAW MATERIALS | PERCENT BY WEIGHT |
| --- | --- |
| Alpha Gypsum | about 60% to about 75% |
| Melamine Formaldehyde Resin | about 5% to about 7% |
| Ammonium Chloride | about 0.1% to about 1% |
| Acrylic Copolymer | about 20% to about 35% |

TABLE 3

| RAW MATERIALS | PERCENT BY WEIGHT |
| --- | --- |
| Hydrocal FGR 95 | about 60% to about 75% |
| BTLM-415 | about 5% to about 7% |
| Ammonium Chloride | about 0.1% to about 1% |
| VF-812 | about 20% to about 35% |

TABLE 4

| RAW MATERIALS | PERCENT BY WEIGHT |
| --- | --- |
| Alpha Gypsum | about 60% to about 75% |
| Melamine Formaldehyde Resin | about 5% to about 7% |
| Ammonium Chloride | about 0.1% to about 1% |
| Acrylic Copolymer | about 20% to about 35% |
| Reinforcement Elements | about 0.5% to about 5% |

TABLE 5

| RAW MATERIALS | PERCENT BY WEIGHT |
| --- | --- |
| Hydrocal FGR 95 | about 60% to about 75% |
| BTLM-415 | about 5% to about 7% |
| Ammonium Chloride | about 0.1% to about 1% |
| VF-812 | about 20% to about 35% |
| Cem-Fil Anti-Crak HP | about 0.5% to about 5% |

TABLE 6

| RAW MATERIALS | PERCENT BY WEIGHT |
| --- | --- |
| Alpha Gypsum | about 60% to about 75% |
| Melamine Formaldehyde Resin | about 5% to about 7% |
| Ammonium Chloride | about 0.1% to about 1% |
| Acrylic Copolymer | about 20% to about 35% |
| Reinforcement Elements | about 0.5% to about 5% |
| Aluminum Powder | about 0.5% to about 5% |

TABLE 7

| RAW MATERIALS | PERCENT BY WEIGHT |
| --- | --- |
| Hydrocal FGR 95 | about 60% to about 75% |
| BTLM-415 | about 5% to about 7% |
| Ammonium Chloride | about 0.1% to about 1% |
| VF-812 | about 20% to about 35% |
| Cem-Fil Anti-Crak HP | about 0.5% to about 5% |
| Aluminum Powder | about 0.5% to about 5% |

TABLE 8

| RAW MATERIALS | PERCENT BY WEIGHT |
| --- | --- |
| Alpha Gypsum | about 60% to about 75% |
| Melamine Formaldehyde Resin | about 5% to about 7% |
| Ammonium Chloride | about 0.1% to about 1% |
| Acrylic Copolymer | about 20% to about 35% |
| Carbon Black | about 0.1% to about 5% |

TABLE 9

| RAW MATERIALS | PERCENT BY WEIGHT |
| --- | --- |
| Hydrocal FGR 95 | about 60% to about 75% |
| BTLM-415 | about 5% to about 7% |
| Ammonium Chloride | about 0.1% to about 1% |
| VF-812 | about 20% to about 35% |
| Carbon Black | about 0.1% to about 5% |

TABLE 10

| RAW MATERIALS | PERCENT BY WEIGHT |
| --- | --- |
| Alpha Gypsum | about 60% to about 75% |
| Melamine Formaldehyde Resin | about 5% to about 7% |
| Ammonium Chloride | about 0.1% to about 1% |
| Acrylic Copolymer | about 20% to about 35% |
| Carbon Black | about 0.1% to about 5% |
| Chop Carbon Fiber | about 0.5% to about 5% |

TABLE 11

| RAW MATERIALS | PERCENT BY WEIGHT |
| --- | --- |
| Hydrocal FGR 95 | about 60% to about 75% |
| BTLM-415 | about 5% to about 7% |
| Ammonium Chloride | about 0.1% to about 1% |
| VF-812 | about 20% to about 35% |
| Carbon Black | about 0.1% to about 5% |
| Chop Carbon Fiber | about 0.5% to about 5% |

TABLE 12

| RAW MATERIALS | PERCENT BY WEIGHT |
| --- | --- |
| Alpha Gypsum | about 60% to about 75% |
| Melamine Formaldehyde Resin | about 5% to about 7% |
| Ammonium Chloride | about 0.1% to about 1% |
| Acrylic Copolymer | about 20% to about 35% |
| Aluminum Powder | about 0.5% to about 5% |
| Chop Carbon Fiber | about 0.5% to about 5% |

TABLE 13

| RAW MATERIALS | PERCENT BY WEIGHT |
| --- | --- |
| FGR 95 | about 60% to about 75% |
| BTLM-415 | about 5% to about 7% |
| Ammonium Chloride | about 0.1% to about 1% |
| VF-812 | about 20% to about 35% |
| Aluminum Powder | about 0.5% to about 5% |
| Chop Carbon Fiber | about 0.5% to about 5% |

Each of the mold compositions (7) set forth in Tables 1-13 provides an amount of alpha gypsum. The term "alpha gypsum" (or an equivalent or substantial equivalent materials) refers to a specially processed gypsum which is calcined under pressure to produce a gypsum material having high compressive strength. Typically, alpha gypsum has a purity CaSO4 of between about 95% and 99% by weight. A commercially available alpha gypsum product suitable for use with the invention is Hydrocal FGR 95 Gypsum Cement (US Gypsum, 125 South Franklin, Chicago, Ill.) (>99% Plaster of Paris)(referred to in the Tables above and hereinafter as "FGR 95"). As shown in Table 3, one embodiment of the inventive mold composition specifically includes FGR 95 about 60% to about 75% by weight which does not contain any reinforcement element, fibers, glass fiber, or the like. This particular brand of alpha gypsum is not intended to be limiting with respect to scope of alpha gypsum products or sources which can be utilized to produce the inventive mold compositions, rather reference to FGR 95 is intended to provide information from which a person of ordinary skill in the art can make and use the numerous and varied inventive mold compositions explicitly and inherently described.

As can be understood from Tables 1-13, alpha gypsum can be included in embodiment(s) of the inventive mold composition (7) in the range of about 50% to about 75% by weight as shown in Table 1, or in the range of about 60% to about 75% as shown in Table 2, or in narrower ranges or the specific percentages by weight set out in the additional formulations below. Greater or lesser weight percent alpha gypsum can be utilized within the ranges indicated depending on the particular mold composition (7) characteristics (such as thermal expansion or contraction) desired for a particular mold (9) application, or the amount of other materials admixed with the alpha gypsum.

As shown in Tables 1-13, the amount of alpha gypsum by weight percent of any mold composition (9) can be mixed with a melamine formaldehyde resin (about 5% to about 7% wt./wt, depending on the application). The term "melamine formaldehyde resin" refers to an amino resin produced from melamine and formaldehyde which can be a syrup if it has low molecular weight or a powder if it has high molecular weight. A suitable molecular weight melamine formaldehyde resin can be a powdered BTLM-415 available from BTL Specialty Resins Corp., Toledo, Toledo, OH (>99% melamine/formaldehyde resin) (referred to in the Tables and hereinafter "BTLM-415"). Again, while the mold composition of Table 3 specifically includes BTLM-415 this is not intended to be limiting with regard to the numerous and varied melamine formaldehyde resins available having similar molecular weight characteristics, but rather is intended to provide an example of a melamine formaldehyde resin from which the numerous and wide variety of mold compositions whether explicitly or inherently described can be made and used.

Again as shown in Tables 1-13, to the mixture of alpha gypsum, melamine formaldehyde, and ammonium chloride an amount of the acrylic co-polymer can be added and mixed to provide the mold composition. A suitable acrylic copolymer which can be utilized in embodiments of the inventive mold composition can be Forton VF-812 available from Ball Consulting Ltd., Suite 201, 338 14$^{th}$ Street, Ambridge, PA 15003 or E.P.S., Inc. 1400 North State Street, Marengo, Illinios (50% proprietary resin and 50% water by weight)(referred to in the Tables and hereinafter as "Forton VF-812"). The ammonium chloride facilitates the crosslinking between the melamine formaldehyde resin and the acrylic copolymer. Again, while the mold composition of Table 3 specifically includes Forton VF-812 this is not intended to be limiting with regard to the numerous and varied acrylic copolymers available having similar material characteristics, but rather is intended to provide an example of a melamine formaldehyde resin from which the numerous and wide variety of mold compositions whether explicitly or inherently described can be made and used. Inventive embodiments of the mold composition (7) include an amount of acrylic co-polymer by weight which does not exceed about 35% by weight which makes thermal expansion sufficiently reduced and consistent to avoid warping of the mold produced from the inventive compositions in the range of temperature and pressure at which molded parts are produced.

Now referring particularly to Tables 4-7, certain embodiments of the inventive mold composition (9) can further include an amount of reinforcement elements of between about 0.5% to about 5% by weight. The reinforcement elements can be an amount of glass fibers or plastic fibers. A reinforcement element suitable for use in the mold composition (9) can be an amount of Cem-Fil Anti-Crak HP available from Saint Gobain Vetrotex America, Inc., 122 West John, Suite 535, Irving, Texas 75039 (glass fibers for reinforcement sold as chopped strands)(referred to in the Tables and hereinafter as "Cem-Fil Anti-Crak HP") can be admixed to various combinations of the raw materials. While Table 5 specifically includes an amount of Cem-Fil Anti-Crak HP this is not this is not intended to be limiting with regard to the numerous and varied reinforcement elements as glass or plastic fibers available having similar material characteristics, but rather is intended to provide an example of a reinforcement element from which the numerous and wide variety of mold compositions whether explicitly or inherently described can be made and used.

Now referring particularly to Tables 6-7 and 12-13, an amount of aluminum powder of between about 0.5% to about 5% by weight (or steel powder or stainless steel powder or other metal powders) available from Composites One, 4026 South West Temple, Salt Lake City, Utah 84107 can be admixed to various combinations of the raw materials.

Now referring particularly to Tables 8-11, an amount of carbon black of between about 0.1% to about 5% can be included in certain embodiments of the mold composition (9).

Now referring particularly to Tables 10-13, an amount of chop carbon fiber of between about 0.1% and about 5% (wt./wt.) can be included in certain embodiments of the mold composition (9). A chop carbon fiber suitable for use in producing the inventive mold compositions can be prepared from carbon fiber catalog number T-700 obtained from Composites One, 4026 South West Temple, Salt Lake City, Utah 84107. The T-700 or similar material is then cut, chopped, or otherwise configured as pieces between about one-quarter inch to about one inch.

Similarly, a variety of materials can be further added to the base mixtures of raw materials (such as the mixtures of raw materials or formulations set out in Tables 1-13) to further include the numerous and varied glass micro-balloons (hollow glass spheres) available from Ashland Chemical Company, 5200 Blazer Parkway, Dublin, Ohio 43017 various types of fiberglass chop, ceramic powder, ceramic chop, or the like, available for example from Composites One, 4026 South West Temple, Salt Lake City, Utah 84107.

The formulations set out by Tables 1-13 are intended to provide a person of ordinary skill in the art sufficient information to make a wide range of particular embodiments of the inventive mold material (mold composition) (7) by utilizing the raw materials listed in the Tables, or equivalents (such as the same raw material under a different name or designated by a different nomenclature or available through a different source) or substantial equivalents of the raw materials (where the raw material may not be identical but is substantially identical in chemical or physical characteristic, or the raw material is identical or substantially identical but further includes a material which does not materially alter the function of the raw material for use in the mold composition (7) but may require alternation of the percent by weight to achieve the same mold composition characteristics achieved with the identical raw material) mixed in various proportions within the ranges forth in the Tables.

For example, the amount of FGR 95 (or equivalent or substantial equivalent) included in particular embodiment(s) of the inventive mold composition (7) can be in the range of about 60% to about 75% by weight, with greater or lesser weight percent utilized within the range depending on the particular mold composition (7) characteristics (such as thermal expansion or contraction) desired for a particular mold (9) application. As to certain embodiments of the mold composition(s) (7) FGR 95 can be for example, about 60% as shown in Tables 4-6, or in a range of about 65%-about 66% as shown Tables 7-9, or can be as to more particular embodiments of the mold composition (7) about 65.91% as shown by Tables 15-16. Similarly each of the other raw materials listed can adjusted within the ranges indicated to achieve numerous and varied mold compositions (7) encompassed by the invention. Understandably, without undue experimentation a wide and numerous variety of mold compositions (9) encompassed by the invention can be made and utilized in the inventive mold (9) production method above-described or by other methods to produce molds (9). One particular advantage of the wide range of inventive mold compositions (7) can be that the coefficient of expansion of the mold (7) can be adjusted to match the coefficient of expansion of the molded material (13). While specific suppliers of the raw materials set out in the Tables above are described, it is not intended that the raw materials must be obtained from these suppliers and the raw materials or the equivalent raw material or the substantially equivalent raw material may be available from numerous and varied sources.

The Hydrocal FGR 95 portion of the mold composition (9) (US Gypsum, 125 South Franklin, Chicago, Ill.) comprises a gypsum cement having glass fibers which can be mixed with the Melamine Formaldehyde Resin Powder (such as product BTLM-415 available from Ball Consulting, Ltd., Suite 201, 338 14$^{th}$ Ambridge, Pa. 15003). The portion of ammonium chloride (CAS No.: 12125-02-9 available from Mallinckrodt Baker, Inc., 222 Red School Lane, Phillipsburg, N.J. 08865) can be admixed to obtain a homogeneous mixture of the raw materials.

To the above-combination of raw materials, the portion of Forton VF-812 (an all acrylic co-polymer available from Ball Consulting Ltd., Suite 201, 338 14$^{th}$ Street, Ambridge, Pa. 15003) can be added and mixed. In the alternative, as shown by Table 2 and Table 3 as examples, the Forton VF-812 can be replaced with a portion of Matrix G C-1 Latex (available from Smooth-On, Inc., 2000 Saint John Street, Easton, Pa. 18042), or a portion of Forton VF-774 (available from Ball Consulting Ltd., Suite 201, 338 14$^{th}$ Street, Ambridge, Pa. 15003).

As shown in Tables 13 and 14, a portion of E-glass fiber, such as Stem Fill Anti-Crack HD 12 millimeter or 62 Glass Back Glass 2 one-half inch, available from Cinco Bain, Spain or Composites One, 4026 South West Temple, Salt Lake City, Utah 84107 can be added to one or more of the above-combinations of raw materials.

As shown in Tables 15 and 16, a portion of Cem-Fil Anti-Crak HP available from Saint-gobain Vetrotex America, Inc., 122 West John, Suite 535, Irving, Tex. 75039 can be admixed to various combinations of the raw materials.

Also, as shown in Tables 15 and 16, a portion of aluminum powder (or steel powder or stainless steel powder or other metal powders) available from Composites One, 4026 South West Temple, Salt Lake City, Utah 84107 can be admixed to various combinations of the raw materials.

Similarly, a variety of materials can be further added to the base mixtures of raw materials (such as the mixtures of raw materials or formulations set out in Tables 1-12) to further include the numerous and varied glass micro-balloons (hollow glass spheres) available from Ashland Chemical Company, 5200 Blazer Parkway, Dublin, Ohio 43017 various types of fiberglass chop, carbon powder, carbon chop, ceramic powder, ceramic chop, or the like available from Composites One, 4026 South West Temple, Salt Lake City, Utah 84107.

As can be easily understood from the foregoing, the basic concepts of the present invention may be embodied in a variety of ways. The invention involves numerous and varied mold compositions and methods of using such mold compositions to generate molds and products produced with such molds.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "mold" should be understood to encompass disclosure of the act of "molding"—whether explicitly discussed or not—and, conversely, were there effectively disclosure of the act of "molding", such a disclosure should be understood to encompass disclosure of a "mold" and even a "means for molding." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the mold compositions herein disclosed and described, ii) the related methods of making and using such mold compositions disclosed and described, iii) similar, equivalent, and even implicit variations of each of these compositions and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, or compositions ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below, if any, are intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any non-provisional patent application including any continuation, division, or continuation-in-part, or similar application thereof.

I claim:

1. A mold composition, comprising:
   a) an amount of alpha gypsum of between about 60% and about 75% (wt./wt.);
   b) an amount of melamine formaldehyde resin of between about 5% and about 7% (wt./wt.);
   c) an amount of ammonium chloride of between about 0.1% and about 1.0% (wt./wt.);
   d) an amount of acrylic copolymer of between about 20% and about 35% (wt./wt.), wherein said acrylic copolymer includes a mixture of acrylic copolymer and water (50:50 wt./wt.);
   e) and an amount of reinforcement elements stable at temperatures in the range of about 175° F. and about 600° F. of about 0.5% to about 5% (wt./wt.).

2. The mold composition as described in claim 1, wherein said amount of reinforcement elements comprise an amount of chop glass fiber.

3. The mold composition as described in claim 1, wherein said amount of reinforcement elements comprise an amount of chop carbon fiber.

4. The mold composition as described in claim 1, further comprising an amount of aluminum powder of about 0.5% to about 5% (wt./wt.).

5. The mold composition as described in claim 1, further comprising an amount of carbon black of about 0.1% to about 5% (wt./wt.).

6. The mold composition as described in claim 4, further comprising an amount of carbon black of about 0.1% to about 5% (wt./wt.).

7. The mold composition as describe in claim 6, further comprising an amount of aluminum powder of about 0.5% to about 5% (wt./wt.).

8. The mold composition as described in claim 1, wherein said an amount of alpha gypsum of between about 60% and about 75% (wt./wt.) comprises an amount of plaster of paris of between about 60% and about 75% (wt./wt.).

9. A method of producing a mold composition, comprising the steps of:
   a) producing a mixture, including:
      i) an amount of alpha gypsum of between about 60% and about 75% (wt./wt.);
      ii) an amount of an amount of melamine formaldehyde resin of between about 5% and about 7% (wt./wt.); and
      iii) an amount of ammonium chloride of between about 0.1% and about 1.0% (wt./wt.);
      iv) an amount of acrylic copolymer of between about 20% and about 35% (wt./wt.), wherein said acrylic copolymer includes a mixture of acrylic copolymer and water (50:50 wt./wt.); and
   d) admixing an amount of reinforcement elements stable at temperatures in the range of about 175° F. and about 600° F. of about 0.5% to about 5% (wt./wt.).

10. The method of producing a mold composition as described in claim 9, wherein said step of admixing an amount of reinforcement elements stable at in the range of about 175° F. and about 600° F. of about 0.5% to about 5% (wt./wt.) comprises the step of admixing an amount of chop glass fiber to said mixture.

11. The method of producing a mold composition as described in claim 9, wherein said step of admixing an amount of reinforcement elements stable at in the range of about 175° F. and about 600° F. of about 0.5% to about 5% (wt./wt.) comprises the step of admixing chop carbon fiber.

12. The method of producing a mold composition as described in claim 9, further comprising the step of admixing an amount of aluminum powder of about 0.5% to about 5% (wt./wt.).

13. The method of producing a mold composition as described in claim 9, further comprising the step of admixing an amount of carbon black of about 0.1% to about 5% (wt./wt.).

14. The method of producing a mold composition as described in claim 12, further comprising the step of admixing an amount of carbon black of about 0.1% to about 5% (wt./wt.).

15. The method of producing a mold composition as described in claim 13, further comprising the step of admixing an amount of aluminum powder of about 0.5% to about 5% (wt./wt.).

16. The method of producing a mold composition as described in claim 9, wherein said an amount of alpha gypsum of between about 60% and about 75% (wt./wt.) comprises an amount of plaster of paris of between about 60% and about 75% (wt./wt.).

* * * * *